Sept. 30, 1958     E. HOFFMEISTER     2,853,781
ANGLE HANDPIECE HEADS, MORE PARTICULARLY
FOR DENTAL PURPOSES
Filed Jan. 18, 1957

United States Patent Office 2,853,781
Patented Sept. 30, 1958

2,853,781

ANGLE HANDPIECE HEADS, MORE PARTICU-
LARLY FOR DENTAL PURPOSES

Erich Hoffmeister, Biberach (Riss), Germany

Application January 18, 1957, Serial No. 635,038

Claims priority, application Germany January 26, 1956

2 Claims. (Cl. 32—27)

This invention relates to angular drilling heads, and more particularly to heads for dental purposes and of the kind in which a tool shank together with an associated bearing can be lockably inserted.

Since high tool speeds of 40,000 revolutions per minute and greater are becoming more common in practice, known drilling heads are subject to substantial and undesirable heating of their bearings and accordingly a relatively rapid wear thereof ensues. This rapid wear is due, at least in part, to the lengths of the bearings relative to the associated tool shanks in known constructions.

It is an object of the invention to provide an improved angular drilling head and more particularly one which is especially suitable for dental purposes.

It is a further object of the invention to provide an improved drilling head which obviates the disadvantages of known constructions by providing for reduced operating temperatures and for increased longevity.

To achieve the above and other objects, the invention contemplates, in accordance with one embodiment thereof, the provision of a drilling head in which a bearing is purposefully designed so as to limit the heat generated during a drilling operation and which accordingly provides for a longer lasting structure.

As a feature of the invention, it is to be noted that novel structure for supporting a driving gear ring is provided wheereby this ring is centered by the insertion of the tool shank in the drilling head.

Advantageously, the invention provides for a structure which is economically manufactured and which can be used with extreme convenience.

For a better understanding of the invention and to show how it may be carried into effect, the same will now be described, by way of example, with reference to the accompanying drawing, in which.

Figure 1:
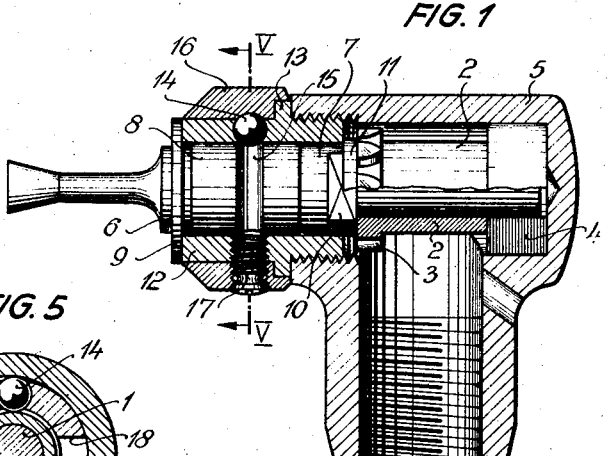
Figure 1 is a longitudinal sectional view of a drilling head, on an enlarged scale.
Figure 5:
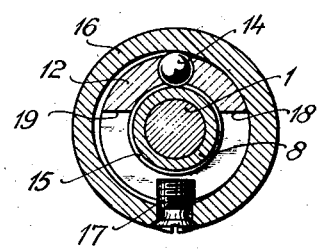
Figure 5 is a cross-sectional view taken along the line V—V of Figure 1.
Figure 3:
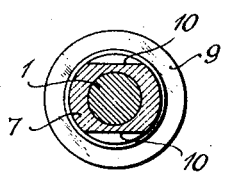
Figure 3 is a cross-sectional view of the tool shank taken along the line III—III of Figure 2.
Figure 2:
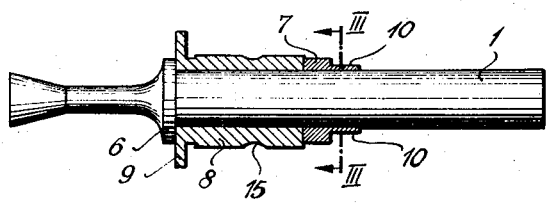
Figure 2 is a longitudinal sectional view of a tool with a tool shank and an associated bearing.
Figure 4:
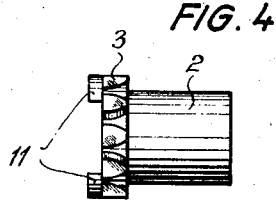
Figure 4 is a side view of a detail of the device.

Referring to the drawings, the angular drilling head indicated at 5 accommodates a tool having a shank 1 with a circular cross-section, and on the rear half of the tool shank there is arranged an upper gear sleeve or driving member 2 which at its front end carries an upper gear ring 3. The tool shank 1 has a rear portion which projects from the rear of the upper gear sleeve 2 and which is mounted in a sapphire bearing 4 housed in the rear of the angle head 5. The forward portion of the tool shank, located between a collar 6 situated outside the head 5 and a collar 7 fitted to the middle portion of the tool shank 1, is mounted in a bushing 8 at the front end of which there is provided a flange 9. The tool shank 1 is assembled together with the bushing 8 to form a single unit and is inserted through a front opening in the head 5. In this operation the sleeve 2 is centered by the inserted tool shank 1.

For the purpose of coupling the sleeve or driving member 2 to the tool shank 1, the collar 7 mounted on the tool shank 1 is formed, on two diametrically opposed sides, with flattened portions 10 over which fit corresponding dogs 11 on the front end of the sleeve or driving member 2, so that the collar 7 and the tool shank can be driven by said sleeve.

In the illustrated embodiment, a bushing 12, having a collar 13 adapted to bear against the front face of the head 5 around the front opening therein, is formed rearwardly of the collar 13 with a threaded portion to permit the bushing 12 to be screwed into the front opening of the angle handpiece head 5. Situated in a hole in the bushing 12 is a ball 14 which is guided in an annular groove 15 in the bushing 8. Outwardly, the ball 14 bears against an eccentric raceway formed in a ring 16, which latter is rotatably mounted on the bushing 12. Depending upon the position of the ring 16, in a rotary sense relatively to the bushing 12, the ball 14 is guided by the eccentrically disposed raceway of the ring 16 in the annular groove 15 of the bushing 8 into a locking position (as illustrated in Fig. 1).

The rotation of the ring 16 into the locking and unlocking positions is limited by an abutment pin 17 which is screwed into the rotatable ring 16 and which has an inner end portion extending into a slot formed in the bushing 12. The abutment pin 17 is engageable with stops 18 and 19 at opposite ends of the slot, to limit the rotational movement of the ring 16.

The bushing 8 could, of course, be locked in a different manner after having been inserted in the head together with the tool shank 1.

I claim:

1. An angular drilling head for accommodating a tool shank comprising a head part defining a bore extending in a direction from front to rear thereof, supporting means toward the front of the bore for rotatably supporting a tool shank to be rotatably mounted in said bore, a sapphire bearing at the rear of the bore for rotatably supporting, in part, said tool shank, a sleeve located between said supporting means and said bearing, said supporting means including a bushing extending over a length of said tool shank spaced from the sleeve so that a part of the tool shank projects rearwardly from said bushing, the projecting part extending to said bearing and centering said sleeve with the tool shank mounted in the head, and coupling means for coupling said sleeve to the tool shank, said coupling means comprising a driven portion on the tool shank and means on said sleeve engageable by said driven portion.

2. A head as claimed in claim 1, wherein the coupling means comprises a collar on the tool shank, flattened portions on said collar, and dogs on the sleeve for engaging the flattened portions.

References Cited in the file of this patent

UNITED STATES PATENTS 1,458,293    Hinchey _____ June 12, 1923